US006904028B1

(12) United States Patent
Semper

(10) Patent No.: US 6,904,028 B1
(45) Date of Patent: Jun. 7, 2005

(54) SYSTEM AND METHOD FOR SENDING INTERMITTENT MESSAGES ON THE A-INTERFACE

(75) Inventor: William Joseph Semper, Richardson, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 922 days.

(21) Appl. No.: 09/724,605

(22) Filed: Nov. 28, 2000

(51) Int. Cl.[7] .............................................. H04Q 7/20
(52) U.S. Cl. ...................................... 370/331; 370/340
(58) Field of Search ................................ 370/331, 338, 370/340

(56) References Cited

U.S. PATENT DOCUMENTS 6,454,904 B1 * 9/2002 Hermans et al. ............ 162/205
2003/0054823 A1 * 3/2003 Choi et al. .................. 455/436

* cited by examiner

*Primary Examiner*—Melvin Marcelo

(57) ABSTRACT

There is disclosed a system and method for sending intermittent messages on the A3 interface to provide, for use in a base station, a message transfer system for transmitting and receiving intermittent messages. The transfer system comprises i) a controller for inserting an intermittent message into a data frame; ii) a selection distribution unit in the base station for receiving and processing the intermittent messages; and iii) a transmitter for sending data frames with the intermittent message inserted to other base stations via the A3 interface.

20 Claims, 6 Drawing Sheets

| 7 | 6 | 5 | 4 | 3 | 2 | 1 | 0 | OCTET |
|---|---|---|---|---|---|---|---|---|
| ⇒ | MESSAGE TYPE II = (XXH) | | | | | | | 1 |
| ⇒ | FORWARD LAYER 3 IS-2000 5 ms MESSAGE {1: | | | | | | | |
| RESERVED = [00] | | 5ms SLOT = [00 TO 01] | | FSN = [0000 tp 111] | | | | 1 |
| (MSB) | MSC/CM | | | | | | | 2 |
| FORWARD LINK INFORMATION = <000000H-FFFFFH> | | | | | | | | 3 |
| | | | | | | | (LSB) | 4 |
| }FORWARD LAYER 3 IS-2000 5ms MESSAGE | | | | | | | | |
| (MSB) | ⇒ | MESSAGE CRC = [0000H-FFFFH] | | | | | | 1 |
| | | | | | | | (LSB) | 2 |

FIG. 4A

| 7 | 6 | 5 | 4 | 3 | 2 | 1 | 0 | OCTET |
|---|---|---|---|---|---|---|---|---|
| ⇒ | MESSAGE TYPE II = (XXCH) | | | | | | | 1 |
| ⇒ | REVERSE LAYER 3 IS-2000 5 ms MESSAGE {1: | | | | | | | |
| RESERVED = '0' | FQ1 = [0,1] | 5ms SLOT = [00 TO 01] | | FSN = [0000 tp 111] | | | | 1 |
| (MSB) | | | | | | | | 2 |
| REVERSE LINK INFORMATION = <000000H-FFFFFFH> | | | | | | | | 3 |
| | | | | | | | (LSB) | 4 |
| }REVERSE LAYER 3 IS-2000 5ms MESSAGE | | | | | | | | |
| (MSB) | ⇒ | MESSAGE CRC = [0000H-FFFFH] | | | | | | 1 |
| | | | | | | | (LSB) | 2 |

FIG. 4B

SYSTEM AND METHOD FOR SENDING INTERMITTENT MESSAGES ON THE A-INTERFACE

TECHNICAL FIELD OF THE INVENTION

The present invention is directed, in general, to cellular communications and, more specifically, to a system for transmitting messages within a broad-band cellular communication system.

BACKGROUND OF THE INVENTION

Communication in cellular communication systems is conducted between a transmitting device and a receiving device over a Communication resource, commonly referred to as a communication channel. Code division multiple access (CDMA) is a mode of cellular communications that allows communication (both voice and data) between multiple users, simultaneously, on a single frequency. The simultaneous operation is accomplished by utilizing different codes for each user and an individual signal is distinguishable only after decoding. A received signal at a base station or mobile unit comprises many frequency and time overlapping coded signals from individual mobile units or base stations. Additionally, in a CDMA wireless system the mobile unit is linked to more than one base station during communication. As the mobile unit travels through the cellular regions, the mobile unit is always seeking to link to the base station with the strongest signal. Switching between base stations may be accomplished via hard handoff or soft handoff. During soft handoff, a mobile may be sending and receiving to three different base stations at the same time. It still has a source base station, but there are other linked base stations that are sending and receiving the same signals.

Generally, in a CDMA system user messages are being sent back and forth between the mobile unit and multiple base stations. These user messages are used, typically, for bringing up a supplemental data channel or reporting power strength that the mobile unit is receiving from the base station in the area. The mobile unit sends pilot strength measurement messages (PSMM) to the source base station and other base stations that the mobile unit is in communication with.

As with all communication systems CDMA has evolved since its debut. The most recent adopted standard, CDMA2000 (IOS V4.0), provides for 5 millisecond (ms) messages to carry essential signaling information to allow for rapid interaction between the mobile and the base station. The 5 msec messages are used for resource requests (SCRM) and allocation messages (SCAM), as well as pilot measurement update. These messages are carried on the Fundamental or Dedicated Control Channel and are always sent at the same rate: 9.6 kpbs. As such, the messages are always 24 bits long (there is an additional 8 bit tail and 16 bit CRC added at the physical layer).

The A3 interface, as defined in the IOS V4.0, carries coded user information (voice/data) and signaling information between the selective distribution unit (SDU) function and the channel element component of the BS (BTS). The A3 interface is composed of two parts: signaling and user traffic. The signaling information is carried across a separate logical channel from the user traffic channel, and controls the allocation and use of channels for transporting user traffic. Currently there is no way for the 5 msec messages to be passed to all the base stations that are in contact with the mobile unit during soft handoff. The IOS V4.0 text does not include support for the 5 msec messages on the A3 interface between base station. The existing 20 millisecond message format cannot be modified to contain the 5 millisecond messages. A frame sequence number (FSN) is included when a 20 msec message is transmitted to a mobile unit because it must be sent from all the base stations involved with the signals synchronized so that they send the frame at the same time to the mobile unit. Not only does the base station have to specify a particular 20 msec slot, but the particular 5 msec slot within the 20 msec slot must be specified. Since there are no extra bits in the 20 msec message there is no way to change the existing messages or use the existing messages to send 5 msec messages during soft handoff.

There is therefore a need in the art for a system that will provide synchronized passage of 5 msec messages between base stations and between base stations and a mobile unit during soft handoff.

SUMMARY OF THE INVENTION

To address the above-discussed deficiencies of the prior art, it is a primary object of the present invention to provide, for use in a base station, a message transfer system for transmitting and receiving intermittent messages. The transfer system comprises i) a controller for inserting an intermittent message into a data frame; ii) a selection distribution unit in the base station for receiving and processing the intermittent messages; and iii) a transmitter for sending data frames with the intermittent message inserted to other base stations via the A3 interface.

According to one embodiment of the present invention, there is provided, for use in a base station, program instructions for expanding frame sequence number information in the data frames.

According to another embodiment of the present invention, there is provided, for use in a base station, instructions for providing a position identifier for the intermittent message.

According to still another embodiment of the present invention there is provided, for use in a base station, instructions for making a plurality of copies of the modified data frame and transmitting all the copies to target base stations.

According to yet another embodiment of the present invention, there is provided, for use in a base station, a time hack for causing the target base stations to transmit the data frame with the intermittent message to a mobile unit.

According to a further embodiment of the present invention, there is provided, for use in a base station, utilizing the A3 interface between base stations to transfer an intermittent message to the selection distribution unit from a mobile unit. The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 4A depicts the layout of a five millisecond Forward message sent from a source BS to a target BS over the A3 interface in accordance with an embodiment of the present invention;

FIG. 4B is a layout of a five millisecond Reverse message sent from a target BS to a source BS over the A3 interface in accordance with an embodiment of the present invention;

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless office network.

Figure 1:
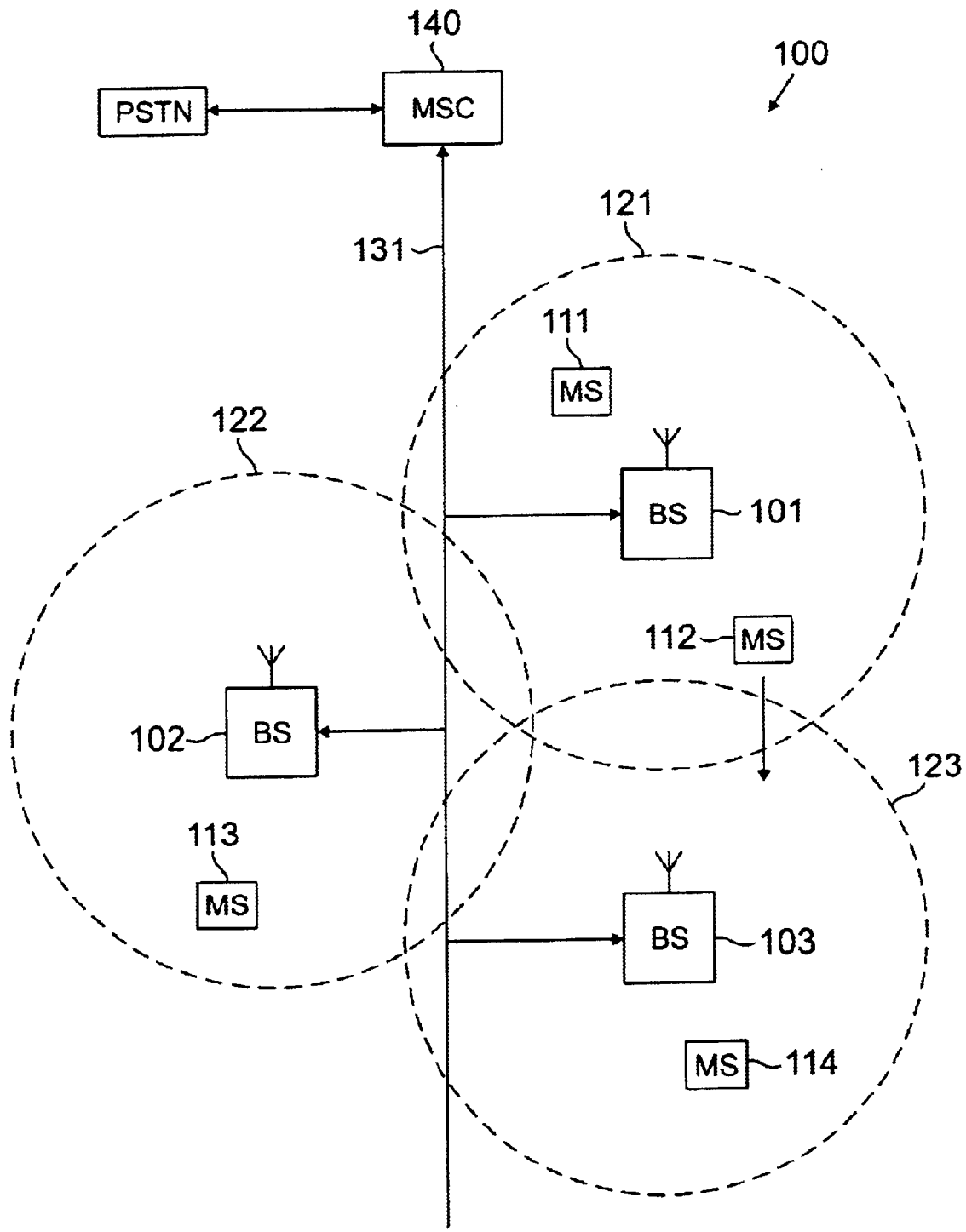
FIG. 1 illustrates a general overview of the exemplary wireless network according to one embodiment of the present invention.

FIG. 1 illustrates a general overview of an exemplary wireless network according to an embodiment of the present invention. Wireless network 100 comprises a plurality of cell sites 121–123, each containing one of the base stations, BS 101, BS 102, or BS 103. Base stations 101–103 are operable to communicate with a plurality of mobile units (MU) 111–114. Mobile units 111–114 may be any suitable wireless communication devices, including conventional cellular telephones, PCS handset devices, portable computers, telemetry devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and both natural and man-made obstructions.

In one embodiment of the present invention, BS 101, BS 102, and BS 103 each may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MU 111 is located in cell site 121 and is in communication with BS 101, MU 113 is located in cell site 122 and is in communication with BS 102, and MU 114 is located in cell site 123 and is in communication with BS 103. MU 112 is also located in cell site 121, close to the edge of cell site 123. The direction arrow proximate MU 112 indicates the movement of MU 112 towards cell site 123. At some point, as MU 112 moves into cell site 123 and out of cell site 121, a "handoff" will occur.

As is well known, the "handoff" procedure transfers control of a call from a first cell to a second cell. "Soft" handoff is a type of handoff that provides for a transfer between cells (base stations) without notice to the MU 112 user. Direct BS to BS signaling and traffic connections between bas stations is supported by the A3 interface. For example, if MU 112 is in communication with BS 101 and senses that the signal from BS 101 is becoming unacceptably weak, MU 112 may then switch to a BS that has a stronger signal, such as the signal transmitted by BS 103. MU 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Figure 2:
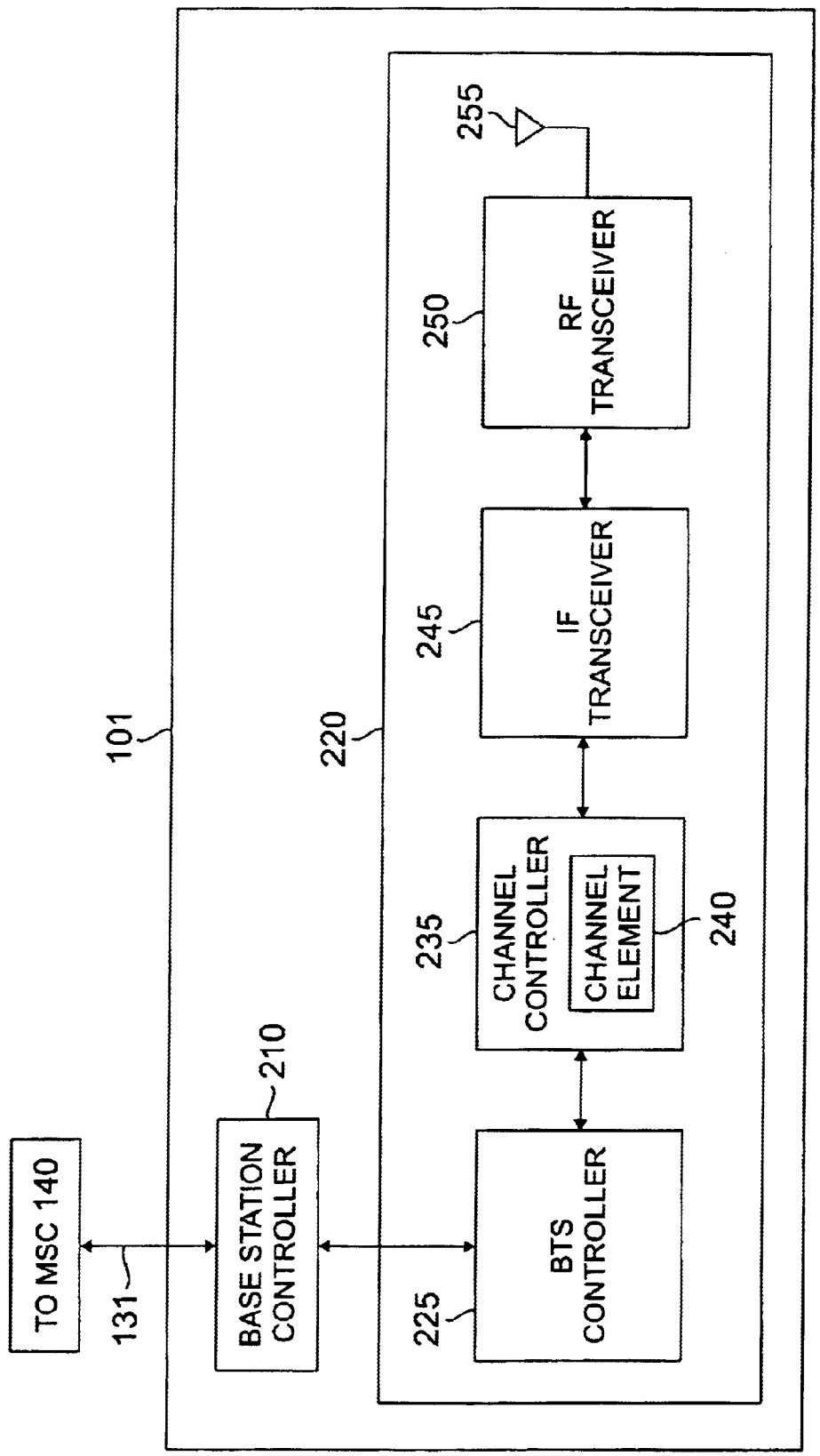
FIG. 2 depicts in greater detail exemplary base station according to one embodiment of the present invention.

FIG. 2 depicts in greater detail exemplary base station according to one embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235, which contains representative channel element 240, transceiver interface (IF) 245, RF transceiver unit 250 and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile unit and a "reverse" channel refers to inbound signals from the mobile unit to the base station. In an advantageous embodiment of the present invention, the channel elements operate according to a code division multiple access (CDMA) protocol with the mobile units in cell 121. Transceiver IF 245 transfers the bi-directional channel signals between channel controller 240 and RF transceiver unit 250.

Antenna array 255 transmits forward channel signals from RF transceiver unit 250 to mobile units in the coverage area of BS 101. Antenna array 255 also sends to transceiver 250 reverse channel signals received from mobile units in the coverage area of BS 101. In a preferred embodiment of the present invention, antenna array 255 is multi-sector antenna, such as a three sector antenna in which each antenna sector is responsible for transmitting and receiving in a 120 degree arc of coverage area. Additionally, RF transceiver 250 may contain an antenna selection unit to select among different antennae in antenna array 255 during both transmit and receive operations.

Figure 3A:
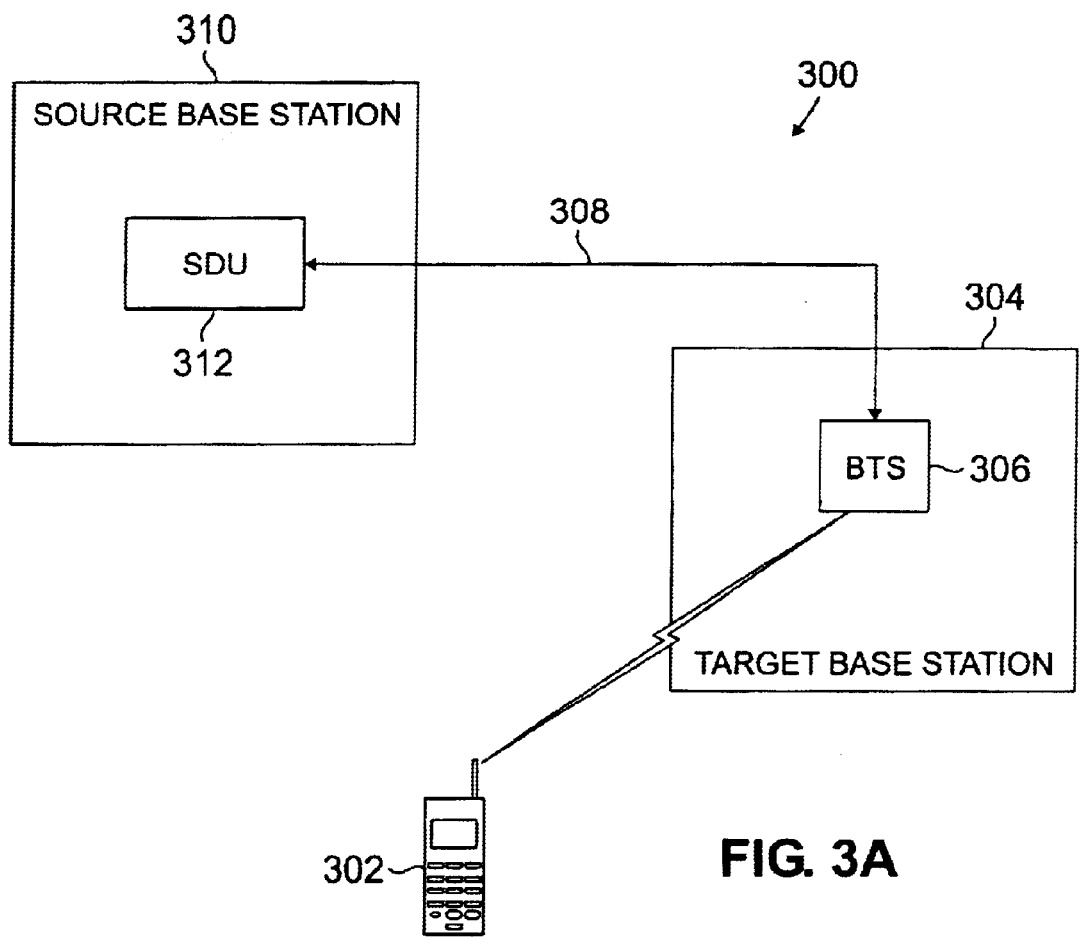
FIG. 3 illustrates a high-level block diagram of a mobile unit in communication with a source base station and a target base station according to an embodiment of the present invention.

FIG. 3A illustrates a high-level block diagram of a mobile unit in communication with a source base station and a target base station according to an embodiment of the present invention. Mobile unit 302 is in communication with base station 304 via base transceiver 306. Mobile unit 302 is also in communication with a source base station 310. In FIG. 1, mobile unit 112 is preparing to enter a cell supported by BS 103. BS 103 becomes the target base station and soft handoff may begin.

Efficient inter-BS soft handoff is supported via direct BS to BS signaling and traffic connections between base stations. The A3 and A7 interfaces are used to support this form of inter-BS soft handoff which is based on packet technologies. The A3 interface, composed of signaling and user traffic subchannels, provides the ability to establish and remove A3 traffic connections. The A3 interface also provides support for operational procedures, such as turning on/off voice privacy or changing the service configuration of a call. The A3-Connect message is sent from the target BS to the source BS to initiate or add cells to one or more A3 user traffic connections. An A3-Connect Acknowledge (Ack) message is expected in response.

Upon receiving the A3 Signaling Address information, the receiving BS begins the process of establishing the A3 signaling connection with the source BS. The A3 Signaling Address is used by the target BS to allocate a logical circuit to be used for A3 signaling. The SDU ID identifies the particular instance of the SDU function. Following the establishment of the A3 signaling link, the A3-Connect message is sent from the target BS to the entity at the other end. The target BS expects an A3-Connect Ack message indicating the result of processing the A3-Connect message. When the A3 user traffic connection(s) is established, traffic packets are exchanged to verify that the two entities can communicate via the A3. (Section 3.4.1.1.1, Inter-operability Specification (IOS V4.0) for CDMA 2000 Access Network Interfaces, June 2000).

The signal is passed through the A3 interface (interface between source and target base stations as defined by IOS V4.0) back to the source base station 310. The signal from mobile unit 302 is passed to selection distribution unit (SDU) 312. SDU 312 receives signals from all the base stations that receive the originating signal from mobile unit 302. SDU 312 then chooses from among the received signals the signal that has the most likelihood of being correct and discards the other signals. In the opposite direction, when source base station 310 is sending packets to mobile unit 302, SDU 312 makes copies of whatever frame of data is to be sent and sends the copies out to the other bases stations, such as BS 304. Additionally, SDU 312 sends the time to transmit the frame. A more clear signal is likely to occur during communications with mobile unit 302 if mobile unit 302 is sending and receiving from multiple base stations at one time. All the information received by the linked base stations is passed to SDU 312 which processes all the messages before transmitting the strongest signal to mobile unit 302.

Figure 3B:
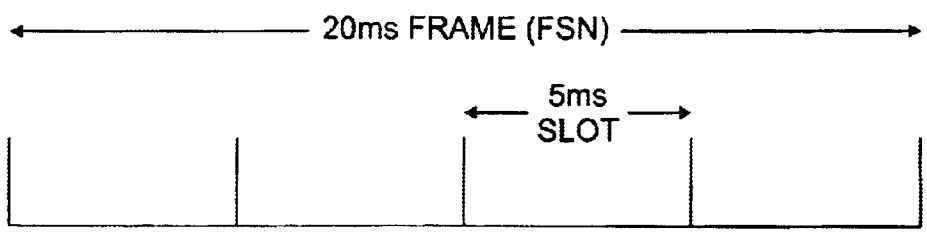

FIG. 3B is a diagram of a 20 msec frame indicating a 5 msec slot for receiving a 5 msec message in one embodiment of the present invention. Since 5 msec messages can be sent/received on any 5 msec sub-interval boundary during a 20 msec frame, the sequence number information in the A3 message must be expanded to include information that indicates which 5 msec sub-interval the message is to be sent (or was received). This is accomplished with a 2-bit field.

FIG. 4A depicts the layout of a 5 msec Forward message sent from a source BS to a target BS over the A3 interface in accordance with an embodiment of the present invention. This A3 message is sent from the source BS to the target BS over A3 IS-2000 user traffic subchannel of type IS-2000 Fundamental Channel (FCH) or IS-2000 DCCH (Dedicated Control Channel) It is used to send a Forward Link ms message to the target BS for transmission to the mobile station.

FIG. 4B is a layout of a 5 msec Reverse message sent from a target BS to a source BS over the A3 interface in accordance with 20 an embodiment of the present invention. This A3 message is sent from the target BS to the source BS over A3 IS2000 user traffic subchannel of type IS-2000 FCH or IS-2000 DCCH. It is used by the target BS to send a decoded Reverse Link 5 msec message and control information to the source BS.

Figure 5A:
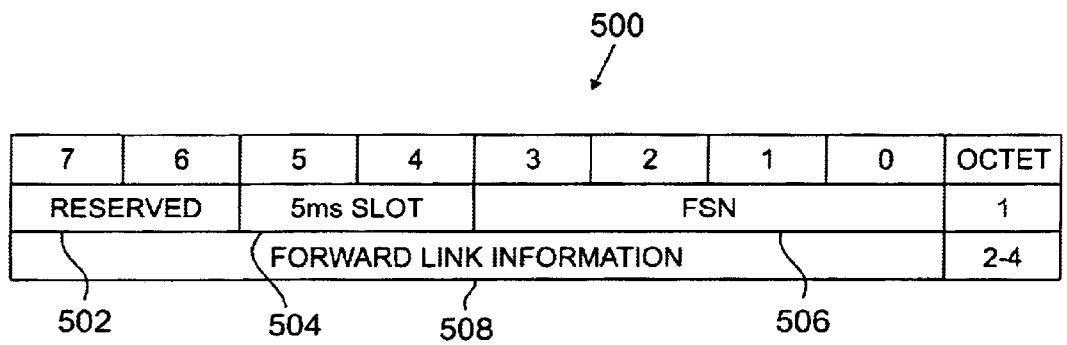
FIG. 5A depicts the layout of a Forward Layer 3 five millisecond message in accordance with an embodiment of the present invention.

FIG. 5A depicts the layout of a Forward Layer 3 5 msec message in accordance with an embodiment of the present invention. Element 500 contains the CDMA Forward 5 msec Message Frame and control information for packets flowing in the selection/distribution unit to base transceiver station direction. The SDU sets Reserved slot 502 to '00'. The SDU sets 5 msec slot 504 to the number of 5 msec sub-intervals that the target BS is to offset the message. For example, the value '00' indicates that the 5 msec message is to be sent at the start of the 20 msec interval, while the value '01' indicates that the message is to be sent in the second 5 msec slot of the 20 msec frame interval. The SDU sets FSN field 506 to system time in frames, Modulo 16 corresponding to the transmission time of the frame over the air in the forward direction. Forward Link Information 508 is set by the SDU and sent to the MS. The SDU sets the information bits in forward link information 508 to the information bits supplied by the multiplex options sublayer and the bit order is as specified in ISO V4.0.

Figure 5B:
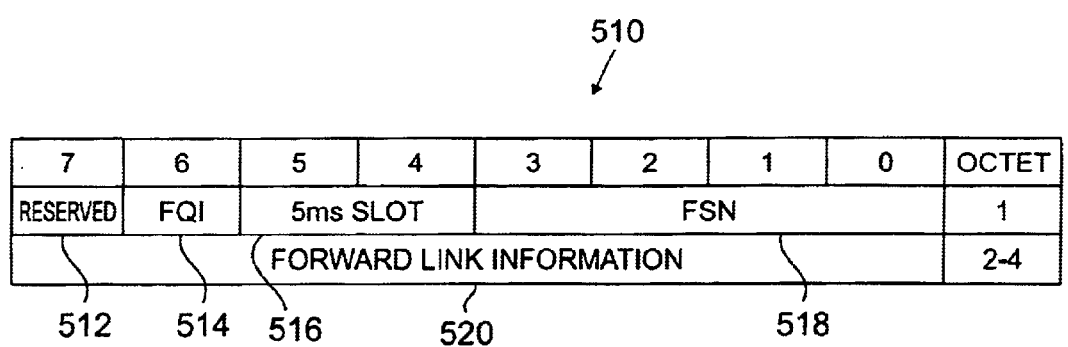
FIG. 5B illustrates the layout of a Reverse Layer 3 five millisecond message in accordance with an embodiment of the present invention.

FIG. 5B illustrates the fields layout of a Reverse Layer 3 5 msec message in accordance with an embodiment of the present invention. Element 510 contains the CDMA reverse 5 msec Message frame and control information for packets flowing in the BTS to SDU direction. Reserved slot 512 is set by the BTS to '0'. Frame quality indicator (FQI) 514 is set to '1' if the Reverse Traffic Frame CRC (not shown) passes. Otherwise, the BTS sets this field to '0'.

5 msec slot 516 is set to the 5 msec sub-interval in which the message was received. For example, the value '00' indicates that the 5 msec message was received at the start of the 20 msec interval, while the value '01' indicates that the message was received in the second 5 msec slot of the 20 msec frame interval. FSN 518 is set by the BTS to CDMA system time in frames, modulo 16 (see IOS v4.0) corresponding to the receive time of the air interface frame in the reverse direction.

Reverse link information 520 is set by the BTS to the information that the BTS receives from the MS. Th BTS sets the Information Bits to the information bits received from the MS which correspond to the Multiplex Option in us (see IOS V4.0). The bit order used is the order specified in IOS V4.0.

Figure 6:
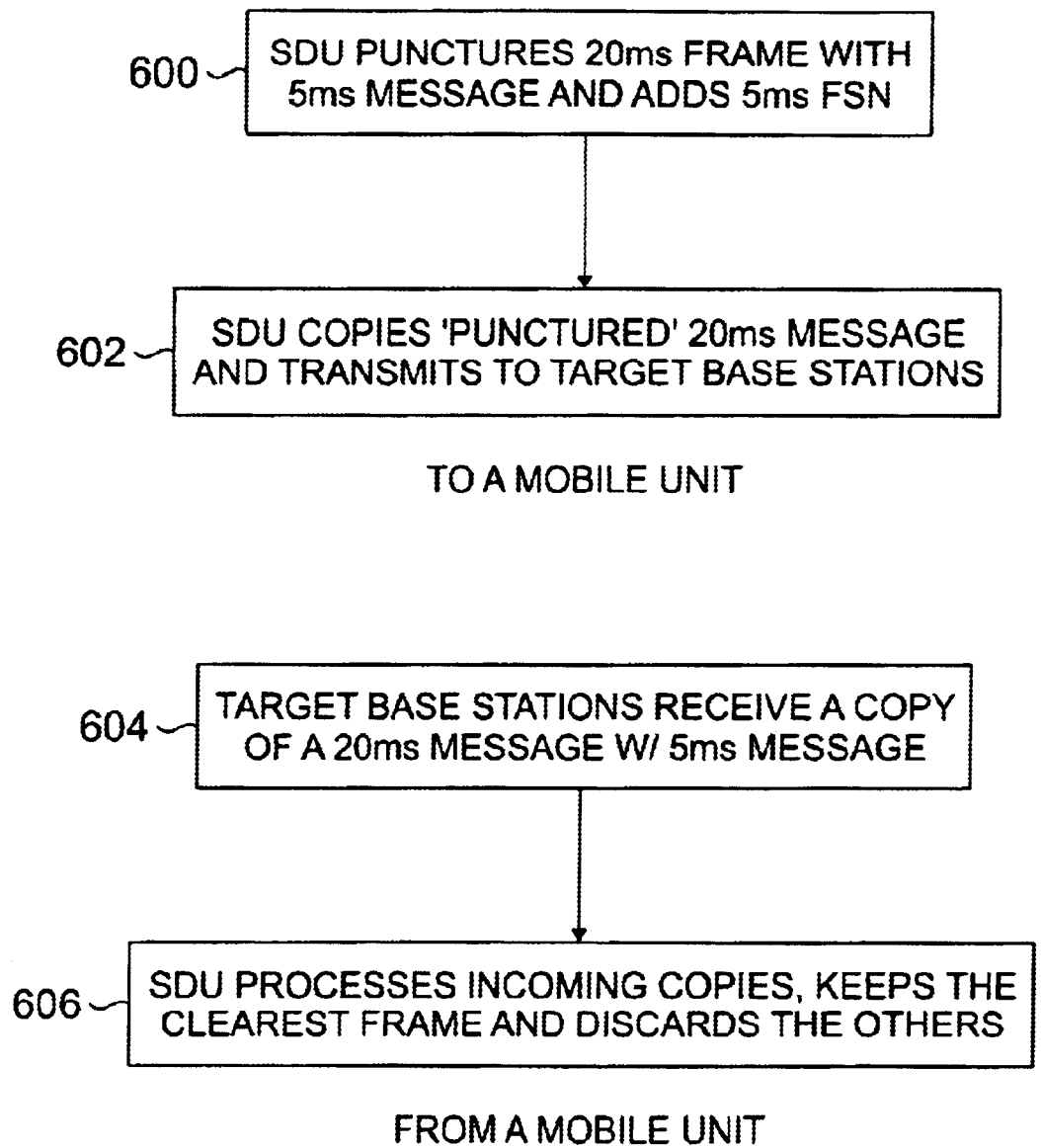
FIG. 6 depicts a high-level block diagram of a process for transmitting intermittent messages via A3 interface in accordance with an embodiment of the present invention.

FIG. 6 depicts a high-level block diagram of a process for transmitting intermittent messages via A3 interface in accordance with an embodiment of the present invention. The process begins when the SDU punctures 5 msec message into a 20 msec data frame. The frame sequence number in the data frame is expanded for the position identifier of the 5 msec message (process step 600).

The selection/distribution unit in the source base station copies the data frame and then transmits the 20 msec message to associated target base stations via the A3 interface. Included in the 20 msec message is a specific time that the target base stations transmit the data frame, with the 5 msec message, to a mobile unit. The target base stations then transmit the 20 msec message to the mobile unit at th same time (process step 602).

The source base station may receive and process 5 msec messages transmitted by a mobile unit to target base stations. In this instance, the process works in the reverse in that the target base stations each transmit a copy of 20 msec data frame from the mobile unit, each 20 msec message including a 5 msec message, to the source station SDU (process step 604). The SDU processes each of the 20 msec messages and determines the 20 msec message with the strongest signal. The remaining messages are then discarded (process step 606).

In the CDMA2000 standard, 5 msec messages that are received during the transmission of a 20 msec frame are punctured into the 20 msec frame on a 5 msec boundary. A 20 msec frame contains quite a bit of repetition because the air interface is so uncertain. The bits in the 20 msec message are interleaved or repeated very often within the 20 msec message. When the 5 msec message is punctured into the 20 msec message there is enough repetition in the rest of the message to assure an accurate frame. Further, it is possible to send a blank or non-data 20 msec message and puncture the 5 msec message into the frame.

It is still possible for the receiver to correctly receive and decode both the 5 msec message and the 20 msec message. As such, the source BS may send a 5 msec message with a sequence number that overlaps with the sequence number for a previously or yet to be sent, 20 msec frame. The 5 msec slot parameter identifies where, in the 20 ms frame, is to be punctured. Similarly, the target BTS may receive a 5 msec message within a 20 msec frame, in which case the target will send both the 5 msec message and 20 msec frame to the source with the same sequence number. Again, the 5 msec slot will identify where in the 20 msec frame the 5 msec message was received.

Because the 5 msec messages are sent/received within 20 msec frames, it is not necessary to include the typ of information in the A3 messages normally associated with 20 msec frames (e.g., power control information and reverse link quality).

Although the present invention has been described in detail, those skilled in the art should understand that they can make various changes, substitutions and alterations herein without departing from the spirit and scope of the invention in its broadest form.

What is claimed is:

1. For use in a wireless network comprising a plurality of base stations, each of said base stations capable of communicating with a plurality of mobile stations, a message transfer system for transmitting and receiving intermittent messages comprising:

a controller for inserting one of said intermittent messages into a data frame;

a selection distribution unit in a source base station for receiving and processing said intermittent messages; and a transmitter for transmitting said data frame to a target base station via an A3 interface.

2. The message transfer system as set forth in claim 1 further comprising:

program instructions for expanding a frame sequence number information in said data frame; and instructions for providing a position identifier for said intermittent message.

3. The message transfer system as set forth in claim 1, further comprising:

instructions for copying said data frame.

4. The message transfer system as set forth in claim 3, wherein said transmitter transmits said copy of said data frame to said target base station.

5. The message transfer system as set forth in claim 1, further comprising a means for including a specific time to transmit said data frame with said intermittent message to a mobile unit.

6. The message transfer system as set forth in claim 1, further comprising:

an interface for sending said intermittent message to said selection distribution unit in said source base station from a plurality of target base stations while a mobile unit is in soft handoff.

7. The message transfer system as set forth in claim 6, further comprising a means in said selection distribution unit for selecting a message having a fewest number of errors from said messages received from said plurality of target base stations and discarding the balance of said received messages.

8. A wireless communications network, comprising:
   a plurality of base stations, each of said base stations capable of communicating with a plurality of mobile stations; and
   a message transfer system for transmitting intermittent messages comprising:
      a controller for inserting one of said intermittent messages into a data frame;
      a selection distribution unit in a source base station for receiving and processing said intermittent messages; and
      a transmitter for transmitting said data frame to a target base station via said an A3 interface.

9. The wireless communications network as set forth in claim 8, wherein said message transfer system further comprises:
   program instructions for expanding a frame sequence number information in said data frame; and
   instructions for providing a position identifier for said intermittent message.

10. The wireless communications network as set forth in claim 8, wherein said message transfer system further comprises:
   program instructions for copying said data frame.

11. The wireless communications network as set forth in claim 10 wherein said transmitter transmits said copy of said data frame to at least one of said target base station.

12. The wireless communications network as set forth in claim 8, wherein said message transfer system further comprises a means for including a specific time to transmit said data frame with said intermittent message to a mobile unit.

13. The wireless communications network as set forth in claim 8, wherein said message transfer system further comprises:
   an interface for sending said intermittent message to said selection distribution unit in said source base station from a plurality of target base stations while a mobile unit is in soft handoff.

14. The wireless communications network as set forth in claim 13, wherein said message transfer system further comprises a means in said selection distribution unit for selecting a message having a fewest number of errors from said plurality of messages received from said plurality of target base stations and discarding the balance of said received messages.

15. For use in a wireless network comprising a plurality of base stations, each of said base stations capable of communicating with a plurality of mobile stations, a method of transmitting intermittent messages over the an A3 interface comprising the steps of:
   inserting one of said intermittent messages into a data frame;
   transmitting said data frame to a of target base station via said A3 interface; and
   receiving and processing said intermittent messages through a selection distribution unit in a source base station.

16. The method for transmitting intermittent messages over the A3 interface as set forth in claim 15, further comprising:
   expanding frame sequence number information in said data frame; and
   providing a position identifier for said intermittent message.

17. The method for transmitting intermittent messages over the A3 interface as set forth in claim 15, further comprising:
   copying said data frame; and
   transmitting said cony to said target base station.

18. The method for transmitting intermittent messages over the A3 interface as set forth in claim 15, further comprising including a specific time to transmit said data frame with said intermittent message to a mobile unit.

19. The method for transmitting intermittent messages over the A3 interface as set forth in claim 15, further comprising:
   sending said intermittent message to a controller in said source base station from a plurality of target base stations via the A3 interface while a mobile unit is in soft handoff.

20. The method for transmitting intermittent messages over the A3 interface as set forth in claim 19, further comprising:
   said controller selecting a message having a fewest number of errors from said plurality of target base stations and discarding the balance of received messages.

* * * * *

UNITED STATES PATENT AND TRADEMARK OFFICE
CERTIFICATE OF CORRECTION

PATENT NO. : 6,904,028 B1
DATED : June 7, 2005
INVENTOR(S) : William Joseph Semper It is certified that error appears in the above-identified patent and that said Letters Patent is hereby corrected as shown below:

Column 6,
Line 62, delete "20";

Column 7,
Line 38, delete "Th" and insert -- The --;
Line 56, delete "th" and insert -- the --;

Column 8,
Line 24, delete "typ" and insert -- type --;

Column 10,
Line 11, delete "the" after the term "over";
Line 15, delete "of" before the term "target".

Signed and Sealed this

Thirtieth Day of August, 2005

JON W. DUDAS
*Director of the United States Patent and Trademark Office*